United States Patent
Sandstrom et al.

(10) Patent No.: US 8,522,847 B2
(45) Date of Patent: *Sep. 3, 2013

(54) TIRE WITH TREAD RUBBER COMPOSITION WHICH CONTAINS DUAL SILICA MOIETIES

(75) Inventors: Paul Harry Sandstrom, Cuyahoga Falls, OH (US); Kuo-Chih Hua, Richfield, OH (US); Shingo Futamura, Wadsworth, OH (US); Kenneth Allen Bates, Brunswick, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 932 days.

This patent is subject to a terminal disclaimer.

(21) Appl. No.: 11/957,549

(22) Filed: Dec. 17, 2007

(65) Prior Publication Data
US 2009/0151830 A1    Jun. 18, 2009

(51) Int. Cl.
*B60C 1/00* (2006.01)
*C08K 3/36* (2006.01)

(52) U.S. Cl.
USPC .......................... 152/450; 524/492

(58) Field of Classification Search
USPC ..................... 524/1, 492; 152/450
See application file for complete search history.

(56) References Cited

U.S. PATENT DOCUMENTS

| 5,789,514 | A | 8/1998 | Burns et al. | 528/12 |
| 7,247,669 | B2 * | 7/2007 | Sandstrom | 524/492 |
| 7,735,533 | B2 * | 6/2010 | Lukich et al. | 152/209.5 |
| 2007/0144642 | A1 * | 6/2007 | Lukich et al. | 152/209.5 |
| 2007/0254993 | A1 | 11/2007 | Lechtenboehmer et al. | 524/213 |

FOREIGN PATENT DOCUMENTS

| EP | 721971 | | 7/1996 |
| EP | 1142730 | | 10/2001 |
| EP | 1228902 | | 8/2002 |
| EP | 1400560 | * | 3/2004 |
| JP | 2005-213508 | * | 8/2005 |

OTHER PUBLICATIONS

Machine translation of JP 2005-213508, 2005.*
European Search Report completed Apr. 28, 2009.

* cited by examiner

*Primary Examiner* — Justin Fischer
(74) *Attorney, Agent, or Firm* — Henry C. Young, Jr.

(57) ABSTRACT

The invention relates to a tire having a tread of a cured rubber composition which contains dual silica moieties in a sense of containing both hydrophilic precipitated silica and in situ hydrophobated precipitated silica.

3 Claims, No Drawings

TIRE WITH TREAD RUBBER COMPOSITION WHICH CONTAINS DUAL SILICA MOIETIES

FIELD OF INVENTION

The invention relates to a tire having a tread of a cured rubber composition which contains dual silica moieties in a sense of containing both hydrophilic precipitated silica and in situ hydrophobated precipitated silica.

BACKGROUND OF THE INVENTION

Tires have previously been proposed which have treads of a rubber composition which contains hydrophilic silica or which contains hydrophilic silica which has been hydrophobated.

A significant aspect of this invention is to provide a tire tread of a rubber composition which contains a combination of hydrophilic precipitated silica and hydrophilic precipitated silica which has been hydrophobated in situ within the elastomer host. In other words, such tire tread rubber composition contains dual silica moieties in a sense of containing both hydrophilic precipitated silica and in situ hydrophobated precipitated silica.

In one embodiment, the hydrophobated precipitated silica is a hydrophilic precipitated silica which has been hydrophobated by treatment with, for example, at least one of an alkoxysilane, organoalkoxysilyl polysulfide (silica coupling agent) and organomercaptoalkoxysilane (silica coupling agent), preferably with an organoalkoxysilyl polysulfide or an organomercaptoalkoxysilane coupling agent, optionally including an alkoxysilane, in situ within the rubber composition.

The hydrophilic precipitated silica is a precipitated silica which has not been hydrophobated with a hydrophobtaining agent, particularly not hydrophobated with a silane based hydrophobtaining agent, particularly a siloxane-containing hydrophobtaining agent for the hydrophilic precipitated silica.

In practice, it is considered herein that the rubber reinforcement contribution of such in situ hydrophobated precipitated silica is different than a rubber reinforcement contribution of the hydrophilic precipitated silica, particularly when the precipitated silica has been hydrophobated with said organoalkoxysilyl polysulfide or organomercaptoalkoxysilane coupling agents.

Historically, synthetic amorphous precipitated silica is typically hydrophilic (water loving) in nature and therefore not readily compatible with diene-based elastomers in rubber compositions in general. For this reason, for rubber compositions which contain a significant precipitated silica content, it is often desirable to hydrophobate the precipitated silica to make it more compatible with diene-based elastomers in a rubber composition for a tire tread.

For this invention, while the mechanism is not fully understood, it has been observed that use of a combination of dual precipitated silica moieties, namely a combination of in situ hydrophobated precipitated silica (particularly when hydrophobated in situ with an organoalkoxysilyl polysulfide or organomercaptoalkoxysilane coupling agent) and hydrophilic precipitated silica, in a diene-based elastomer tire tread composition can beneficially provide a tire tread with one or more physical properties which are different than when using only such hydrophobated precipitated silica or when only using a hydrophilic precipitated silica. For example, it has been observed that a tire tread running surface having a relatively high wet coefficient of friction can be obtained by using such combination of dual silica moieties as compared to a tire tread containing a significant in situ hydrophobated precipitated silica content (particularly when hydrophobated in situ with such silica coupling agent) without the presence of a hydrophilic precipitated silica. Apparently the silica coupling agent in situ treated precipitated silica acts to enhance desirable physical properties of the tire tread rubber composition, whereas the hydrophilic precipitated silica does little to enhance the tread rubber physical properties in the manner of the hydrophobic precipitated silica but, instead, particularly enhances the wet coefficient of friction of the tread rubber running surface in a manner which is significantly better than obtained with the hydrophobated silica.

Accordingly, while the mechanism may not be completely understood, it is envisioned that the hydrophobated precipitated silica enhances desirable physical properties and that the hydrophilic ("water loving") precipitated silica can beneficially enhance an increase in wet traction of the tread rubber surface and therefore is beneficial for a tire tread in a sense of traction performance for wet driving conditions.

It is considered herein that use of such dual silica moieties in a tire tread is novel and a departure from past practice.

A challenge is therefore presented as to how to suitably obtain a combination of such dual silica moieties in a tire tread rubber composition.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a tire is provided with a circumferential rubber tread including the running surface of the tire tread, of a rubber composition which contains dual silica moieties comprised of a combination of in situ hydrophobated precipitated silica and hydrophilic precipitated silica.

Such in situ hydrophobated precipitated silica is a hydrophilic precipitated silica which is hydrophobated in situ within the rubber composition.

In practice, said hydrophilic precipitated silica may be hydrophobated in situ within the rubber composition by treatment with, for example, at least one of alkoxysilane, organosiloxysilyl polysulfide (a silica coupling agent) and organomercaptoalkoxysilane (a silica coupling agent), and preferably with such organosiloxysilyl polysulfide or organosiloxymercaptosilane, optionally including such alkoxysilane. Such treatment may be accomplished in situ within the rubber composition in an internal rubber mixer.

In one embodiment, said tire tread rubber composition is comprised of, based upon parts by weight per 100 parts by weight of rubber (phr):

(A) at least one conjugated diene-based elastomer, and
(B) about 30 to about 120 phr of reinforcing filler comprised of:
  (1) about 30 to about 120 phr of precipitated silica, or
  (2) a combination of precipitated silica and rubber reinforcing carbon black comprised of about 30 to about 120 phr of precipitated silica and up to about 60 phr of rubber reinforcing carbon black;

wherein said precipitated silica is comprised of:
(a) about 50 to about 95 weight percent of in situ hydrophobated precipitated silica (hydrophobated in situ within said diene-based elastomer), and
(b) about 5 to about 50 weight percent hydrophilic precipitated silica;
wherein said hydrophobated precipitated silica is hydrophobated in situ within the rubber composition by treatment with an organoalkoxysilyl polysulfide or organomercaptosilane which optionally includes an alkoxysilane.

In further accordance with the invention a method of preparation of a precipitated silica reinforced rubber composition for a tire tread is provided comprised of at least two preparatory non-productive mixing steps followed by a productive mixing step, which comprises, based upon parts by weight per 100 parts by weight rubber (phr):

(A) blending a hydrophilic precipitated silica with a rubber composition comprised of at least one conjugated diene-based elastomer in at least one preparatory non-productive mixing step in an internal rubber mixer, and hydrophobtaining said hydrophilic precipitated silica with a silane-based hydrophobtaining agent in situ within said rubber composition in at least one of said non-productive mixing steps to thereby form a hydrophobated precipitated silica-containing rubber composition (at a temperature of, for example, in a range of from about 135° C. to about 175° C.);

(B) removing said hydrophobated precipitated silica-containing rubber composition from its internal rubber mixer, (and allowing said rubber composition to thereafter cool to a temperature below about 40° C.);

(C) blending a hydrophilic additional precipitated silica with said hydrophobic precipitated silica-containing rubber composition in at least one different and subsequent preparatory non-productive mixing step (subsequent to said preparatory non-productive mixing step in which said initial hydrophilic precipitated silica is added) in an internal rubber mixer, (in the absence of addition of a silane-containing hydrophobtaining agent for said hydrophilic additional precipitated silica) to form a rubber composition which contains dual silica moieties in a form of a combination of said in situ hydrophobated precipitated silica and said hydrophilic additional precipitated silica;

wherein said precipitated silica is hydrophobated by treatment of said precipitated silica in situ within said rubber composition with a hydrophobtaining agent comprised of an organoalkoxysilyl polysulfide or organomercaptoalkoxysilane, optionally including an alkoxysilane.

A significant aspect of this invention is the initial hydrophobation of a hydrophilic precipitated silica with said hydrophobtaining agent in situ within a rubber composition in a mixing step within an internal rubber mixer, removal of the hydrophobated silica-containing rubber composition from the internal rubber mixer, followed by a separate addition in a separated mixing stage (a completely separate addition from said initial, or first, addition of a hydrophilic precipitated silica) of an additional hydrophilic precipitated silica in a subsequent mixing step in a internal rubber mixer in the absence of additionally adding a silane based hydrophobation agent for said additional hydrophilic precipitated silica.

This is considered herein as being significant in a sense that the aforesaid separated mixing steps for a precipitated silica with a rubber composition enables the preparation of a rubber composition which contains dual silica moieties in a form of a combination of both hydrophobic precipitated silica and hydrophilic precipitated silica for a sulfur cured rubber tread.

In practice, such subsequent mixing of the hydrophilic precipitated silica can be administered, for example:

(A) in a separate non-productive mixing step immediately following the precipitated silica hydrophobation mixing step, or (B) in a separate non-productive mixing step following the precipitated silica hydrophobation mixing step with an additional separate non-productive mixing step therebetween, or (C) in a separate, subsequent productive mixing step in which sulfur and sulfur curatives are added to the rubber composition.

In practice, as hereinbefore indicated, said hydrophobtaining agent for said hydrophilic precipitated silica for the purposes of this invention, is at least one of alkoxysilane, organosiloxysilyl polysulfide and organomercaptoalkoxysilane In practice, representative of said organoalkoxysilyl polysulfides is, for example, a bis(3-trialkoxysilylpropyl) polysulfide having an average of from about 2 to about 3.8, alternately an average of from about 2 to about 2.6, sulfur atoms in its polysulfidic bridge. Exemplary of said bis(3-trialkoxysilylalkyl) polysulfide is comprised of a bis(3-triethoxysilylpropyl) polysulfide.

In practice, representative of said alkoxysilane is, for example, an alkoxysilane of the general formula (I):

$$Z_n\text{—}Si\text{—}R_{4-n} \qquad (I)$$

wherein R is a saturated alkyl radical having from one to 18, preferably from one to 8, carbon atoms such as, for example, methyl, ethyl, isopropyl, n-butyl and octadecyl radicals, n is a value of from 1 to 3 and Z is an alkoxy radical represented as $(R^1O)$—, wherein $R^1$ is a saturated alkyl radical having from one to 3 carbon atoms such as, for example, methyl, ethyl and isopropyl radicals, preferably at least one of methyl and ethyl radicals.

Representative examples of alkoxysilanes of Formula (I) are, for example, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Accordingly, said alkoxysilanes have an alkoxy group being reactive with the hydroxyl groups (e.g. silanol groups) contained on the surface of the precipitated silica aggregates.

In the practice of this invention, the tread of the tire may be a rubber composition comprised of various conjugated diene based elastomers. Such diene-based elastomers may be polymers and copolymers of conjugated dienes, such as, for example, isoprene and 1,3-butadiene, and copolymers of at least one conjugated diene hydrocarbon and vinyl aromatic compound selected from styrene and alphamethyl styrene, preferably styrene.

For example, representative of such elastomers are natural cis 1,4-polyisoprene rubber, synthetic cis 1,4-polyisoprene rubber, c is 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2content in a range of about 10 to about 90 percent based on its polybutadiene derived portion and a polystyrene content in a range of about 10 to about 60 percent based upon the copolymer, styrene/high trans 1,4-butadiene copolymer rubber having a trans-1,4 content in the range of about 40 to about 80 percent based on its polybutadiene derived portion, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

Further representative of such elastomers are functionalized elastomers as, for example, amine and silane functionalized organic solution polymerization prepared styrene/butadiene copolymers (functionalized S-SBR's) and amine and silane functionalized organic solution polymerization prepared cis 1,4-polybutadiene elastomers may also be used.

Additional representative of such elastomers are, for example, organic solution polymerization prepared tin coupled elastomers such as for example, tin coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, elastomers are, for example, styrene/butadiene copolymer elastomers exemplified for example in U.S. Pat. No. 5,064,901.

Various commercially available amorphous synthetic silicas (precipitated silicas) may be added to the rubber composition for the reinforcement of the diene based elastomers. Such silicas may be characterized by the their BET and CTAB surface areas. Representative of such silicas, for example, only and without limitation, are silicas available from PPG Industries under the Hi-Sil trademark with designations 210, 243, etc; silicas available from Rhodia, with designations of Zeosil 1165 MP and Zeosil 165GR, silicas available from Degussa AG with designations VN2 and VN3, and silicas available from Huber such as Zeopol 8745 and Zeopol 8715.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials.

The presence and relative amounts of the above additives are not considered to be an aspect of the present invention, unless otherwise indicated, which is more primarily directed to a tire with a tread, including the tread running surface, of a rubber composition containing dual silica moieties in a form of in situ hydrophobated precipitated silica and hydropohilic precipitated silica.

The tires can be built, shaped, molded and cured by various methods which will be readily apparent to those having skill in such art.

The following Example is provided to further understand the invention. The parts and percentages are by weight unless otherwise indicated.

EXAMPLE I

An evaluation is made for providing a tire tread, including its running surface, of a rubber composition which contains dual silica moieties in a sense of a hydrophilic precipitated silica and an in situ hydrophobic precipitated silica.

Such rubber composition is prepared by hydrophobtaining a hydrophilic precipitated silica in situ within the rubber composition to form an in situ hydrophobated precipitated silica with a silane based hydrophobtaining agent, namely a bis(3-triethoxysilylpropyl) polysulfide silica coupler, followed by adding additional hydrophilic precipitated silica to the rubber composition in a separate, subsequent, mixing step.

Rubber compositions identified herein as rubber Samples A, B, C and D were prepared and the rubber Samples evaluated for wet and dry coefficients of friction (COF).

Control rubber Sample A contains only a hydrophilic precipitated silica without a hydrophobated precipitated silica.

Experimental rubber Sample B (the invention) contains dual silica moieties, namely:

(A) an in situ hydrophobated precipitated silica which is a hydrophilic precipitated silica hydrophobated in situ within the rubber composition by a silica coupler in the first non-productive mixing stage (NP1), and (B) a hydrophilic precipitated silica added in a separate, subsequent, sequential non-productive mixing step (NP2) without addition of a coupling agent.

Comparative experimental rubber Samples C and D contained:

(A) an in situ hydrophobated precipitated silica which is a hydrophilic precipitated silica added in the first non-productive mixing stage (NP1) and hydrophobated in situ within the rubber composition by a silica coupler in the first non-productive mixing stage (NP1), and (B) an additional in situ hydrophobated precipitated silica which is a hydrophilic precipitated silica added in the second non-productive mixing stage and hydrophobated in situ within the rubber composition by addition of a silica coupler in the said second non-productive mixing stage.

The rubber Samples were prepared by mixing polyisoprene rubber with reinforcing fillers in a first non-productive mixing stage (NP1) in an internal rubber mixer for about 4 minutes to a temperature of about 160° C. The resulting mixture was subsequently mixed in a second sequential non-productive mixing stage (NP2) in an internal rubber mixer to a temperature of about 160° C. to which additional hydrophilic precipitated silica was added. The rubber composition was subsequently mixed in a productive mixing stage (P) in an internal rubber mixer with a sulfur cure package, namely sulfur and sulfur cure accelerator(s), for about 2 minutes to a temperature of about 115° C. The rubber composition is removed from its internal mixer after each mixing step and cooled to below 40° C. between each individual non-productive mixing stage and before the final productive mixing stage.

In this manner, then, the second addition of the hydrophilic precipitated silica is completely separate from and disconnected from the first addition of the hydrophilic precipitated silica and its associated hydrophobation agent (silica coupler). It is therefore considered herein that little or no hydrophobation agent remains from the first hydrophobation agent addition to significantly hydrophobate the second addition of the hydrophilic precipitated silica.

The basic formulation for the comparative rubber Samples A, B. C and D is presented in the following Table 1 expressed in parts by weight per 100 parts of rubber unless otherwise indicated.

TABLE 1

| | Samples | | | |
|---|---|---|---|---|
| | A | B | C | D |
| First Non-Productive Mixing Stage (NP1) | | | | |
| Synthetic polyisoprene rubber[1] | 100 | 100 | 100 | 100 |
| Carbon black[2] | 20 | 20 | 20 | 20 |
| Processing oil | 6 | 6 | 6 | 6 |
| Fatty acid[3] | 2 | 2 | 2 | 2 |
| Antidegradant(s)[4] | 2 | 2 | 2 | 2 |
| Precipitated (hydrophilic) silica[5] | 15 | 15 | 15 | 15 |
| Zinc oxide | 5 | 5 | 5 | 5 |
| Silica coupler(50/50 carbon black composite)[6] | 0 | 2.5 | 3 | 4 |
| Second Non-Productive Mixing Stage (NP2) | | | | |
| Precipitated (hydrophilic) silica[5] | 15 | 15 | 15 | 15 |
| Silica coupler(50/50 carbon black composite)[6] | 0 | 0 | 2 | 3.5 |
| Productive Mixing Stage (P) | | | | |
| Sulfur | 1.4 | 1.4 | 1.4 | 1.4 |
| Accelerator(s)[7] | 2.2 | 2.2 | 2.2 | 2.2 |

[1]Cis 1,4-polyisoprene rubber as NAT 2200 from The Goodyear Tire & Rubber Company 1
[2]N299, rubber reinforcing carbon black, ASTM identification
[3]Primarily stearic acid (at least 90 percent by weight stearic acid)
[4]Quinoline based antidegradant
[5]Precipitated silica as HiSil 210 ™ from PPG
[6]Silica coupler comprised of bis(3-triethoxysilylpropyl) polysulfide having an average of from about 2.2 to about 2.6 connecting sulfur atoms in its polysulfidic bridge with a carbon black carrier in a 50/50 weight ratio (therefore 50 percent active as a coupler) and reported in the Table as the composite, obtained as SI266 ™ from Degussa.
[7]Sulfenamide and quanidine type of accelerators The following Table 2 illustrates cure behavior and various physical properties of rubber compositions based upon the basic recipe of Table 1 and reported herein as Control Sample A, Sample B and comparative Samples C and D. Where cured rubber samples are examined, such as for the stress-strain, hot rebound and hardness values, the rubber samples were cured for about 12 minutes at a temperature of about 170° C.

The heading for Table 2 shows the respective non-productive mixing steps, namely NP1 and NP2, in which the respective hydrophilic silica and hydrophobtaining agent (silica coupler) were added.

TABLE 2

| | Samples | | | |
|---|---|---|---|---|
| | Control | Invention | | |
| | A | B | C | D |
| Carbon black (added in NP1) | 20 | 20 | 20 | 20 |
| Silica, hydrophilic (added in NP1) | 15 | 15 | 15 | 15 |
| Silica Coupler (added in NP1) | 0 | 2.5 | 3 | 4 |
| Silica, hydrophilic (added in NP2) | 15 | 15 | 15 | 15 |
| Silica Coupler (added in NP2) | 0 | 0 | 2 | 3.5 |

TABLE 2-continued

| | Samples | | | |
|---|---|---|---|---|
| | Control | Invention | | |
| | A | B | C | D |
| Coefficient of Friction[1] | | | | |
| Wet substrate | 2.6 | 2.4 | 1.5 | 1.2 |
| Dry substrate | 2.8 | 2.8 | 2.9 | 2.6 |
| Stress-strain, ATS[2] 14 min, 160° C. | | | | |
| Tensile strength (MPa) | 20.7 | 22.8 | 23.3 | 23.7 |
| Elongation at break (%) | 666 | 581 | 557 | 535 |
| 300% modulus, ring (MPa) | 3.9 | 8.2 | 9.7 | 11 |
| Rebound | | | | |
| 23° C. | 46 | 51 | 50 | 50 |
| 100° C. | 60 | 65 | 64 | 65 |
| Shore A Hardness, 23° C. | 57 | 64 | 67 | 69 |
| RPA[3] (100° C.), Storage Modulus G', MPa | | | | |
| Uncured G' 15% strain | 0.18 | 0.18 | 0.18 | 0.18 |
| Cured G' modulus, 10% strain | 1.2 | 1.4 | 1.5 | 1.6 |

[1]ASTM D-1894. A coefficient of friction (COF) value for a rubber sample may be measured, for example, on a Model SP-2000 Slip/Peel tester from IMASS Inc at 6 inches (about 15.2 cm) per minute using a 200 g sled against a substrate surface such as, for example, a polished aluminum surface.
[2]Automated Testing System (ATS) instrument by the Instron Corporation which can incorporate as many as six tests in one system. Such instrument may determine ultimate tensile, ultimate elongation, moduli, etc.
[3]Rubber Process Analyzer as RPA 2000 ™ instrument by Alpha Technologies In the above Table 2, it can be seen that the hydrophilic precipitated silica was added in both the first (NP1) and the second (NP2) separate non-productive mixing stages (it was removed from the internal rubber mixer of the NP1 mixing stage, cooled to below 40° C. and then mixed in the NP2 mixing stage in an internal rubber mixer).

It can be observed in Table 2 that, for the dry coefficient of friction, addition of increasing levels of silica coupler to Control rubber Sample A, namely for rubber Samples B. C and D, had no significant effect, although physical properties such as tensile strength, 300 percent modulus, rebound and cured storage modulus (G') at 10 percent strain were significantly improved.

It can further be observed in Table 2 for the wet coefficient of friction, a combined addition of both hydrophilic silica and silica coupler (hydrophobtaining agent) to both of the sequential non-productive mixing stages (NP1 and NP2) in Samples C and D to therefore form an in situ hydrophobated silica in both the NP1 and NP2 mixing stages had a significant and rather dramatic negative effect on the wet coefficient of friction (wet COF) with reduced values of only 1.5 and 1.2 as compared to a value of 2.6 for the Control rubber Sample A.

In sharp contrast, it can next be observed in Table 2 that, for Sample B, which represents this invention, addition of hydrophilic precipitated silica in the separate, second non-productive mixing stage (NP2) without an accompanying addition of the silica coupler (hydrophobtaining agent) resulted in a comparable wet coefficient of friction (wet COF), namely a value of 2.4, to that of the Control rubber Sample A which has a desirably high wet coefficient of friction (wet COF) value of 2.6.

The sharp contrast becomes even more evident when observing that the beneficial wet coefficient of friction (wet COF) of the surface of rubber Sample B was obtained while other physical properties were significantly improved as compared to Control rubber Sample A, a combination which was not observed for rubber Samples C and D which, instead, had dramatically poorer wet coefficients of friction.

Accordingly, it is concluded from this Example that the addition of the hydrophilic silica and silica coupler (hydrophobation agent) in the first non-productive mixing step (NP1), followed by a separated sequential addition of hydrophilic silica in a second non-productive mixing step (NP2) without the coupling agent addition (hydrophobation agent addition), enabled the preparation of a rubber composition which contained dual silica moieties in a form of an in situ hydrophobated precipitated silica (hydrophobated in situ within the rubber composition) and a hydrophilic precipitated silica where the in situ hydrophobated silica promoted enhanced physical properties of the rubber composition (rubber Sample B) and where the presence of the hydrophilic precipitated silica promoted a suitable wet coefficient of friction (wet COF) for the surface of the rubber composition suitable for a cured tire tread, particularly including its running surface.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparation of a precipitated silica reinforced rubber composition for a tire tread which contains dual silica moieties comprised of an in situ hydrophobated precipitated silica and a hydrophilic precipitated silica comprised of at least two sequential preparatory non-productive mixing steps followed by a productive mixing step, which comprises, based upon parts by weight per 100 parts by weight rubber (phr):

(A) blending a hydrophilic precipitated silica with a rubber composition comprised of at least one conjugated diene-based elastomer selected from cis 1,4-polyisoprene, cis 1,4-polybutadiene and styrene/butadiene copolymer to the exclusion of functionalized styrene/butadiene copolymer in at least one preparatory non-productive mixing step in an internal rubber mixer, and hydrophobating said hydrophilic precipitated silica with a hydrophobating agent in situ within said rubber composition in at least one of said non-productive mixing steps to thereby form a hydrophobated precipitated silica-containing rubber composition;

(B) removing said hydrophobated precipitated silica-containing rubber composition from its internal rubber mixer, (C) blending a hydrophilic additional precipitated silica with said hydrophobated precipitated silica-containing rubber composition in at least one different and subsequent preparatory non-productive mixing step in an internal rubber mixer in the absence of additionally adding a silane based hydrophobation agent for said additional precipitated silica, to form a rubber composition which contains dual silica moieties in a form of a combination of said in situ hydrophobated precipitated silica and said hydrophilic additional precipitated silica;

wherein said hydrophilic precipitated silica is hydrophobated in situ within the rubber composition by treatment with a hydrophobation agent comprised of an alkoxysilane wherein said alkoxysilane is of the general formula (I):

$$Z_n\text{—Si—}R_{4-n} \qquad (I)$$

wherein R is a saturated alkyl radical having from one to 8 carbon atoms, n is a value of from 1 to 3 and Z is an alkoxy radical represented as $(R^1O)$—, wherein $R^1$ is a saturated alkyl radical having from one to 3 carbon atoms.

2. The method of claim 1 wherein, for said alkoxysilane hydrophobation agent, R is selected from at least one of methyl, ethyl, isopropyl, n-butyl and octadecyl radicals and $R^1$ is selected from at least one of methyl and ethyl radicals.

3. The method of claim 1 wherein said alkoxysilane hydrophobation agent is selected from at least one of trimetboxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane and diethoxy dimethyl silane.

* * * * *